Figure 1:
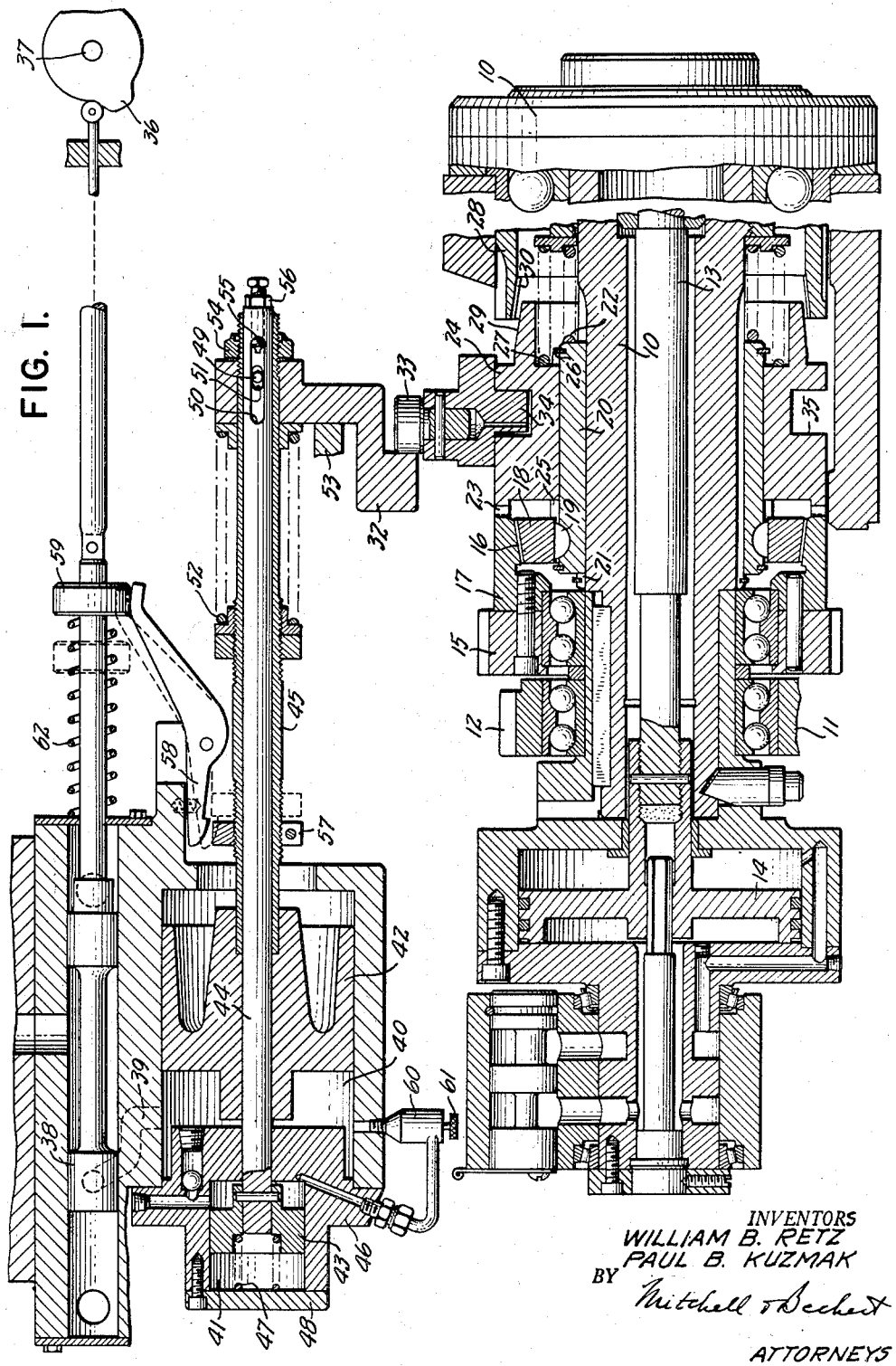

Jan. 29, 1957

W. B. RETZ ET AL 2,779,447

SPINDLE-STOP MECHANISM

Filed July 24, 1953

2 Sheets-Sheet 1

FIG. I.

INVENTORS
WILLIAM B. RETZ
PAUL B. KUZMAK
BY
*Mitchell & Bechert*

ATTORNEYS

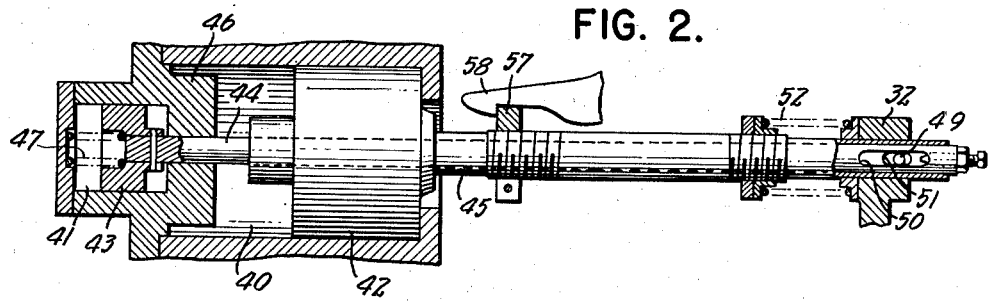
FIG. 2.
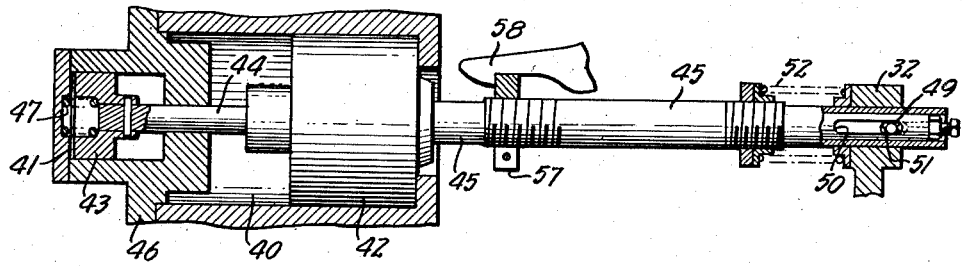
FIG. 3.
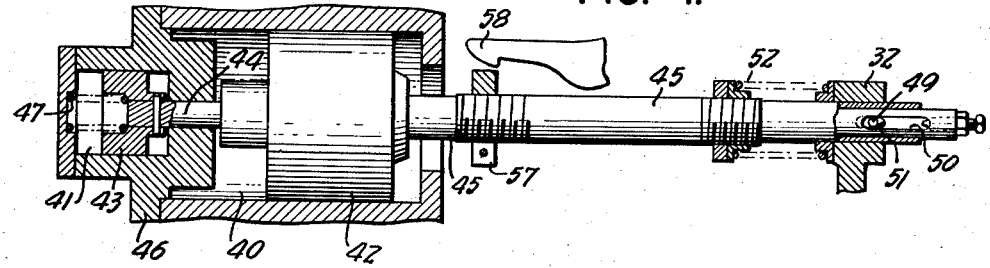
FIG. 4.
FIG. 5.
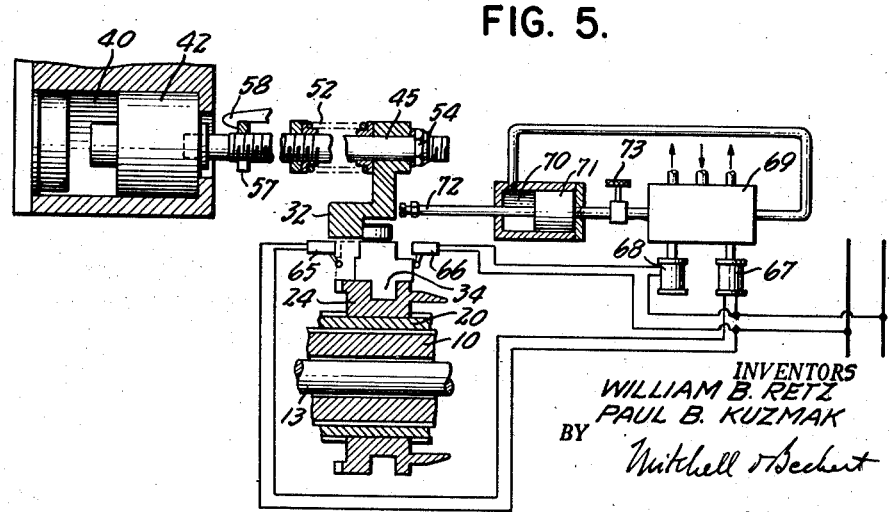
INVENTORS
WILLIAM B. RETZ
PAUL B. KUZMAK
BY
Mitchell & Bechert
ATTORNEYS

United States Patent Office 2,779,447
Patented Jan. 29, 1957

2,779,447

SPINDLE-STOP MECHANISM

William B. Retz, Plainville, and Paul B. Kuzmak, Wethersfield, Conn., assignors to The New Britain Machine Company, New Britain, Conn., a corporation of Connecticut Application July 24, 1953, Serial No. 370,100

14 Claims. (Cl. 192—138)

This invention relates to automatic rotating means and is of particular application to automatic chucking machines in which irregularly shaped work pieces are to be chucked in a given orientation or radial position with respect to a chucking axis.

It is an object of the invention to provide an improved machine of the character indicated.

It is another object to provide an improved means for disengaging the drive from a chucking spindle in a machine of the character indicated.

It is a further object to provide an improved means for automatically controlling the spindle-braking program in a chucking machine; more specifically, it is an object to provide a means for automatically braking the spindle only sufficiently long to stop rotation, and then to release the brake without clutching the spindle drive.

It is a general object to meet the above objects with a mechanism which may automatically de-clutch and brake a spindle to rest and then free the spindle from driven rotation, all in the shortest possible time, so as thereby to provide the most efficient operating cycle and at the same time to improve the productive efficiency of the machine.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a somewhat schematic longitudinal sectional view of important elements in the combination of our invention, as applied to an automatic chucking machine;

Figs. 2, 3, and 4 are simplified fragmentary sectional views of the same set of parts, for three relative positions thereof, in an operating cycle of the mechanism of Fig. 1; and Fig. 5 is a fragmentary diagrammatic view illustrating a modification.

Briefly stated, our invention contemplates the improvement of automatic spindle de-clutching and braking means in machines of the character indicated, by the incorporation of a delay-operated mechanism which may be responsive to the shift from clutched to braked positions and which may serve, after the lapse of a predetermined delay, to disengage the brake without re-engaging the clutch. By suitable adjustment of the delay to accommodate the momentum of the spindle (including the chuck and the work) for any given set-up, the brake can be set for application only during that amount of time required to bring the spindle to rest, at which time the spindle is automatically freed for manual or powered rotation to produce a given angular orientation of the chuck, thereby facilitating work removal and work loading.

Referring to Fig. 1 of the drawings, our invention is shown in application to an automatic multiple-spindle chucking machine, comprising a plurality of spindles, such as the spindle 10, revolubly carried in a spindle carrier 11, which in turn may be indexed by automatic means including an index-drive gear 12. Chucking means (not shown in detail) for spindle 10 may include an actuating rod 13 extending longitudinally within the spindle 10 to the rear of the spindle carrier, as for actuation by automatically controlled hydraulic means 14 of familiar construction.

Continuously running driving means for the spindle 10 may include a drive gear 15, and in the form shown friction and dog clutches are used to engage the drive gear 15 to the spindle 10. The friction-clutch means may comprise mating conical surfaces 16 of a drive member 17 (which may form part of the gear 15) and of a ring 18, keyed at 19 to a shift sleeve 20, which in turn is slidable in splines 21 on the spindle 10; spring means 22 may constantly urge the sleeve 20 and, therefore, also ring 18 for friction-clutch engagement at 16 to the drive means 15. The dog clutch may comprise interlocking teeth 23 on member 17 and on a selector sleeve 24 longitudinally slidable in splines 25 with respect to the sleeve 20. Spring means 27 may serve continuously to urge the selector 24 for positive engagement at 23 to drive means 15, and the relative positioning of friction and dog-clutch parts is of course preferably such that whenever the drive is being engaged to the spindle, the friction clutch is the first to engage, thereby providing more gentle spindle acceleration and minimizing the shock, if any, when the dog-clutch engages; the abutment ring 26 will be understood to regulate the relative placement of friction-clutch and dog-clutch elements to assure the indicated sequence of clutching events, upon a controlling shift of selector 24.

Braking means for the spindle 10 may comprise a member 28 fixed to the frame of the spindle carrier 11 and therefore not rotatable with the spindle 10. Coacting conical surfaces 29 (on the selector 24) and 30 (on the fixed member 28) may be engaged to produce the braking action; in the situation depicted in Fig. 1, the drive 15 is engaged to spindle 10, and therefore the braking surfaces 29—30 are free of each other. For a purpose which will later be clear, there is preferably an intermediate position of the selector 24, in which intermediate position neither the clutch nor the brake means 16—30 is engaged; therefore, in such intermediate position the spindle 10 may be free for manual or other rotation, as when needed to produce a desired angular orientation of the spindle.

In order to actuate the selector 24 in the multiple-spindle machine shown, a spindle-stop cam slide 32 may be provided at the chucking station, so that, when the spindle carrier indexes a spindle (10) into the chucking station, a follower roll 33, longitudinally slidably carried by the spindle carrier and having a tongue or fork 34 constantly riding in a peripheral groove 35 in the selector 24, may serve to control the clutched or braked condition of the spindle, as by movement to the right of the position shown in Fig. 2 and against the combined action of springs 22—27.

In the form shown, we employ hydraulic actuating means for positioning the spindle-stop cam slide 32, and for automatic operation this actuation may occur under the control of programming means, as provided by a cam 36 on the camshaft 37 of the machine. For the relation of parts shown in Fig. 1, the drive is engaged and, therefore, the hydraulic control piston 38 actuated by the cam 36 is in a position closing off the drive passage 39 to the hydraulic mechanism.

The hydraulic mechanism may include cylinders 40—41, having pistons 42—43 connected in actuating relation with the slide 32. In the form shown, both pistons are concentric, and a piston rod 44 for the second piston 43 is slidable within a hollow piston rod 45 for the first piston 42. The cylinder 41 may be formed out of the cap or head 46 for the first cylinder 40, and spring means 47 retained by the cap or head 48 on the second cylinder 41 may serve to urge the second piston 43 constantly to the right, in the sense of the drawing.

The two piston rods 44—45 may be connected to the slide 42 through lost-motion means including a pin 49 fixedly carried by the slide 32 and passing through an elongated slot 50 in the inner or second piston rod 44, while also passing through a second and more limited elongated slot 51 in the first or hollow piston rod 45. Springs 22—27 will, through follower 33, urge slide 32 to a rear position, as limited by a frame abutment 53; and, through spring 52, this positioning of slide 32 will carry piston 42 to the rear position shown. Adjustment may be made for the rearmost position of the piston 42 by means of an exposed nut 54 threaded on the outer end of the piston rod 45 and engaged with the slide 32; and an adjustable abutment screw 55 and locking means 56 therefor may be carried by the inner piston rod 44 and accessible for adjustable interception of the pin 49, for a purpose which will be made clear.

To complete the structure shown, the outer piston rod 45 may adjustably carry a latch nut 57, and frame-supported latch means 58 may engage and hold the nut 57 when the piston 42 has been fed to a forward position, representing disengagement of the clutch 16—23. The latch lever 58 may be actuated to release its hold on the nut 57 whenever the control piston 38 is in the position shown, that is, the position cutting off supply of hydraulic pressure to the piston 42, and for this purpose an abutment or boss 59 on the actuating rod for piston 38 may provide the desired control.

In accordance with a feature of the invention, and for the specific organization of Fig. 1, delay-operated means may serve to control the movement of piston 43 upon the lapse of a given interval of time after movement of piston 43 from left to right, in the sense of the drawing. In this connection, we show a bleed connection between the driving ends of both pistons 42—43, and we provide an orifice member 60, having manually adjustable means 61, in this bleed connection. It will be understood that the delay time (i. e. time required for build-up of actuating pressure on the driving end of piston 43) may be selected as needed.

A better understanding of the operation of the described parts may be had by additional reference to Figs. 2, 3, and 4. Let it be assumed that the spindle 10 has just been indexed into the chucking station and that the drive 15 is still connected, meaning that clutching means 16—23 is still engaged. As soon as convenient at the chucking station, and preferably just prior to, or substantially immediately upon, spindle 10 reaching the chucking station, cam 36 may be effective to admit declutching fluid pressure to the driving end of cylinder 40, so that piston 42 is at once propelled to the position represented in Fig. 2; at the same time, camshaft 37 may be automatically declutched by means not shown. In said position of Fig. 2, both clutch elements 16—23 will have been disengaged, and the selector 24 will have passed its intermediate position and will have engaged the brake 29—30 so as to decelerate the spindle 10. Meanwhile, and at a rate depending upon the selected setting of the variable orifice at 61, an actuating pressure will be developing over the driving end of piston 43; after the expiration of the selected delay, this pressure will be sufficient to overcome spring 47 and to retract rod 44 (and with it stop 55) to the position shown in Fig. 3. Before attaining the position shown in Fig. 3, stop 55 will have intercepted pin 49 and will have relieved the brake surface 29—30 so as to set the spindle free for manual or other rotation, as needed for chucking orientation. Incidentally, for the positions of both Figs. 2 and 3, latch means 58 will have engaged the stop nut 57 so as to hold piston 42 in the forward position and thus to prevent clutch engagement; in the attainment of the neutral or relieved-brake condition, stop 55 will have driven pin 49 (and therefore slide 32) a small displacement to the left against the action of spring 52.

As long as the spindle 10 is in neutral, and is thus free of the drive and of the brake, the spindle may be oriented as desired, and chucking and unchucking may proceed, as through automatic or manual actuation of the means 14. The camshaft will have been stopped on the high point of cam 36, so that full hydraulic pressures may maintain pistons 42—43 in their actuated positions. Upon re-engaging camshaft 17 to start the next working cycle, camshaft 37 will drive cam 36 off its high point and thus allow spring 62 to cut off the supply of actuating fluid to the cylinders 40—41. At the same time, latch 58 will be released and the fluid trapped in the cylinders may be bled off by means not shown, thus allowing springs 22, 27, 52, and 47 to return the parts to the position shown in Fig. 1, and as also shown in abbreviated form in Fig. 4.

In Fig. 5, we show a modification involving the substitution of certain parts for some of those shown in Fig. 1. The same declutching and braking cylinder 40 and pistons 42 may again serve to effect declutching and braking, with latch 58 retaining the actuated position of rod 45; but, instead of the second or auxiliary cylinder and pistons 41 and 43, electrical limit switches 65—66 may control solenoid valves 67—68, respectively, governing, through a distributor 69, the supply of actuating fluid to a double-acting cylinder 70. The piston 71 within cylinder 70 may position an actuating rod 72 against slide 32, so as to relieve selector 24 and return it to the neutral or intermediate position, representing disengaged clutch and disengaged brake. Rod 72 will hold this condition as long as unchucking and chucking is taking place and, when the camshaft 37 is again started, cam 36 will release latch 58 and will relieve the supply of pressure to cylinder 40; slide 32 will be retracted, the clutch 16—23 will be re-engaged, and limit switch 65 will be contacted in order to re-position the actuating rod 72 in its retracted position (shown).

It will be seen that we have described a relatively simple mechanism for automatically bringing a spindle to rest and freeing the same in the shortest possible time. For any given machine set-up, a single adjustment at 61 or 73, as the case may be, will suffice to control the period of brake application and for rapidly establishing the neutral or intermediate position; and small adjustments at 56 may be necessary from time to time to compensate for brake wear.

While we have described the invention in detail for the preferred forms shown, it will be understood that modifications may be made within the scope of the invention as defined in the claims which follow.

We claim:

1. In an automatic chucking machine, a spindle, continuously running means for driving said spindle, a clutch for engaging said drive means to said spindle, a brake for arresting rotation of said spindle, means for selectively and alternately engaging said clutch and brake, timing means including a camshaft for automatically governing a cycle of operations of said machine, means driven by said camshaft for actuating said selective means at one part of said cycle of operations, whereby at such time the drive to said spindle may be disengaged and said spindle may be braked, and thus said actuation of said selective means may be viewed as an actuation of said brake, delay-operated means responsive to such actuation of said brake and including brake-disengaging means, whereby said brake may be disengaged automatically after a predetermined time delay, and releasable means positioned to prevent clutch reengagement upon disengagement of said brake.

2. In an automatic machine of the character indicated, a spindle, drive means for said spindle, brake means for said spindle, a single selector selectively actuating said clutch and said brake, and shifting means for said selector comprising actuating means including a first actuator driving said selector from a clutched position to a braked position, delay-operated means responsive to said actuating means and including a second actuator for repositioning said selector to a location intermediate said clutched and braked positions after attainment of a predetermined delay by said delay means.

3. In a machine of the character indicated, a spindle, drive means including a clutch for said spindle, braking means for said spindle, and automatic control means for controlling the arresting and freeing of said spindle, said automatic means comprising shiftable means actuating said clutch from an engaged to a disengaged position and actuating said brake from a disengaged to an engaged position, delay operated means responsive that operation of said control means which effects shifting from clutched to braked position, and actuating means controlled by said delay-operated means and controlling disengagement of said brake to the exclusion of engagement of said clutch upon attainment of the delay determined by said delay-operated means.

4. In a machine of the character indicated, a spindle, drive means for said spindle, a clutch for engaging said drive means to said spindle, a brake for arresting rotation of said spindle, a shiftable selector common to said brake and clutch and having a first position in which said clutch is engaged; said selector also having an intermediate position in which neither said clutch nor said brake is engaged, and a third position in which the brake is engaged; hydraulically operated means including a piston with a travel sufficient to drive said selector from said first to said third position, further hydraulically operated means including a piston with a travel sufficient to drive said selector from said third to said intermediate position, and delay-operated means responsive to supply of hydraulic pressure to said first piston and controlling the delayed actuation of said second piston for moving said selector from said third to said intermediate position.

5. A machine according to claim 4, in which said delay-operated means includes a bleed connection between the drive end of said first piston to the drive end of said second piston.

6. A machine according to claim 5, in which said bleed connection includes an adjustably variable orifice, whereby delay time may be adjustably selected to suit the set-up of the machine.

7. In a machine of the character indicated, a spindle, drive means for said spindle, a clutch for engaging said drive means to said spindle, a brake for arresting rotation of said spindle, a shiftable selector common to said brake and clutch and having a first position in which said clutch is engaged; said selector also having an intermediate position in which neither said clutch nor said brake is engaged, and a third position in which the brake is engaged; yieldable means constantly urging said selector toward said first position, hydraulic control mechanism for actuating said selector against the action of said yieldable means, said hydraulic mechanism comprising first and second cylinders with independent pistons therein, said first piston being connected to drive said selector against the action of said yieldable means and having a travel sufficient to move said selector from first to third position thereof, said second piston having a travel sufficient to move said selector from said third to said intermediate positions, and delay means responsive to supply of actuating fluid pressure to said first cylinder for supplying actuating pressure to said second cylinder with a predetermined delay thereafter.

8. A machine according to claim 7, in which said cylinders are concentric and include concentric, relatively movable piston rods, a lost-motion connection between said rods, said resilient means urging said rods to one limit of such lost motion.

9. In a machine of the character indicated, a spindle, drive means including a clutch for said spindle, braking means for said spindle, and automatic means for controlling the arresting and freeing of said spindle, said automatic means comprising shiftable means actuating said clutch from an engaged to a disengaged position and actuating said brake from a disengaged to an engaged position, electrically operated delay means responsive to such shifting from clutched to braked position, and actuating means controlled by said delay means and controlling disengagement of said brake to the exclusion of engagement of said clutch upon attainment of the delay determined by said delay means.

10. A machine according to claim 9, in which said electrically operated means includes limit switches responsive to attainment of said clutched and braked positions respectively, the limit switch at the braked position being connected to initiate operation of said delay means, and the limit switch at the clutched position being connected to reset said delay means for another delay operation.

11. In a machine of the character indicated, a spindle, drive means including a clutch for said spindle, braking means for said spindle, and automatic means for controlling the arresting and freeing of said spindle, said automatic means comprising shiftable means actuating said clutch from an engaged to a disengaged position and actuating said brake from a disengaged to an engaged position, delay-operated means responsive to a positioning of said shiftable means in the brake-actuating position, and actuating means controlled by said delay-operated means and controlling disengagement of said brake to the exclusion of engagement of said clutch upon attainment of the delay determined by said delay-operated means.

12. In a machine of the character indicated, a spindle, drive means including a clutch for said spindle, braking means for said spindle, and automatic means for controlling the arresting and freeing of said spindle, said automatic means comprising shiftable means actuating said clutch from an engaged to a disengaged position and actuating said brake from a disengaged to an engaged position, actuating means controlling disengagement of said brake to the exclusion of engagement of said clutch, and delay means including a source of fluid pressure and an adjustable orifice for controlling said actuating means to disengage said brake a preset delay after a clutch-disengaging operation of said automatic means.

13. A machine according to claim 2, in which said actuating means includes means electrically responsive to attainment of a braked position of said selector, said electric means being in controlling relation with said delay-operated means.

14. A machine according to claim 2, in which said actuating means includes a source of fluid pressure in driving relation with both said actuators, and in which said delay-operated means includes a throttling orifice in the fluid connection between said source and said second actuator.

References Cited in the file of this patent

UNITED STATES PATENTS

| | | |
|---|---|---|
| 1,375,415 | Pearson | April 19, 1921 |
| 1,542,400 | Ter Meer | June 16, 1925 |
| 2,232,698 | Eastman | Feb. 25, 1941 |
| 2,600,667 | Mason | June 17, 1952 |